United States Patent
Kumar et al.

(10) Patent No.: US 9,264,521 B2
(45) Date of Patent: Feb. 16, 2016

(54) METHODS AND SYSTEMS FOR ENCAPSULATING AND DE-ENCAPSULATING PROVIDER BACKBONE BRIDGING INSIDE UPPER LAYER PROTOCOLS

(71) Applicant: BROADCOM CORPORATION, Irvine, CA (US)

(72) Inventors: Vivek Kumar, Bangalore (IN); Santhosh Kumar Chandrasekar, Salem (IN)

(73) Assignee: Broadcom Corporation, Irvine, CA (US)

( * ) Notice: Subject to any disclaimer, the term of this patent is extended or adjusted under 35 U.S.C. 154(b) by 108 days.

(21) Appl. No.: 14/089,668

(22) Filed: Nov. 25, 2013

(65) Prior Publication Data
US 2015/0124831 A1    May 7, 2015

Related U.S. Application Data

(60) Provisional application No. 61/899,078, filed on Nov. 1, 2013.

(51) Int. Cl.
| | |
|---|---|
| H04L 12/26 | (2006.01) |
| H04L 29/06 | (2006.01) |
| H04L 12/741 | (2013.01) |
| H04L 12/911 | (2013.01) |

(52) U.S. Cl.
CPC ............. *H04L 69/22* (2013.01); *H04L 45/745* (2013.01); *H04L 47/745* (2013.01)

(58) Field of Classification Search
None
See application file for complete search history.

(56) References Cited

U.S. PATENT DOCUMENTS

| | | | | |
|---|---|---|---|---|
| 7,724,745 | B1* | 5/2010 | Elangovan et al. | 370/392 |
| 8,675,519 | B2* | 3/2014 | Bragg et al. | 370/255 |
| 2010/0142537 | A1* | 6/2010 | Lee et al. | 370/395.53 |
| 2010/0158024 | A1* | 6/2010 | Sajassi et al. | 370/401 |

* cited by examiner

*Primary Examiner* — Frank Duong
(74) *Attorney, Agent, or Firm* — McDermott Will & Emery LLP

(57) ABSTRACT

Methods and systems for encapsulating and de-encapsulating a customer frame component of a Provider Backbone Bridging header are provided. The customer frame component includes a customer local area network identifier and a customer destination address. The customer frame component can be received at an ingress port of a network device for transmission. Header information can be determined from the customer local area network identifier and the customer destination address. A key can be set in the header information to a predefined value for a Provider Backbone Bridging protocol. A backbone service instance identifier can be determined from the customer local area network identifier. The header information and backbone service instance identifier can be concatenated with the customer frame component to form a frame. The frame can be provided to an egress port of the network device for transmission, where the egress port is determined from the header information.

23 Claims, 11 Drawing Sheets

200

| B-DA | B-SA | 802.1Q Tag 0x88A8 | B-VID | EtherType 0x88E7 | ITAG |
|---|---|---|---|---|---|
| C-DA | C-SA | 802.1Q Tag 0x8100 | C-VID | Payload | B-FCS |

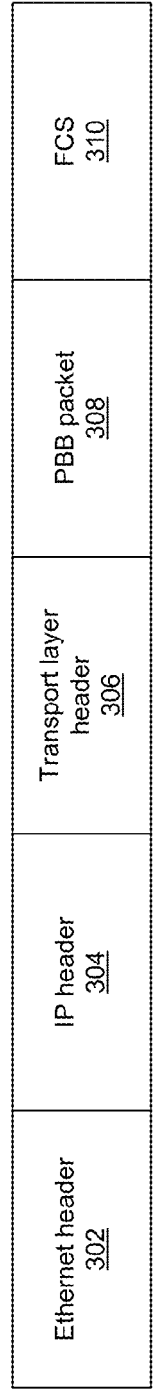

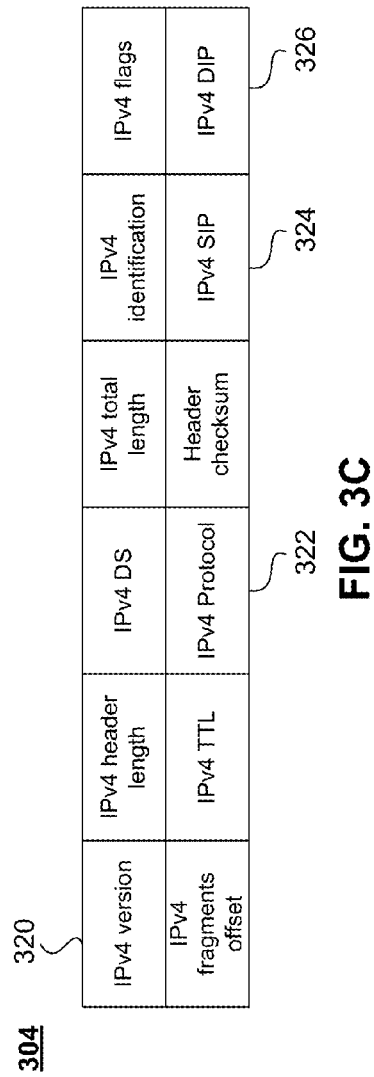

METHODS AND SYSTEMS FOR ENCAPSULATING AND DE-ENCAPSULATING PROVIDER BACKBONE BRIDGING INSIDE UPPER LAYER PROTOCOLS

CROSS-REFERENCE TO RELATED APPLICATIONS

The present application claims the benefit of U.S. Provisional Patent Application No. 61/899,078, entitled "Methods and Systems for Encapsulating and De-encapsulating Provider Backbone Bridging inside Upper Layer Protocols", filed on Nov. 1, 2013, which is hereby incorporated by reference in its entirety for all purposes.

TECHNICAL FIELD

The present description relates generally to communications, and more particularly, but not exclusively, to methods and systems for encapsulating and de-encapsulating provider backbone bridging inside upper layer protocols.

BACKGROUND

Provider Backbone Bridging, also referred to as Mac-in-Mac, has been standardized as IEEE 802.1ah-2008. Provider Backbone Bridging can allow isolation between different customer address spaces in Ethernet switches. Intermediate switches in a backbone domain can perform switching/forwarding of customer frames based on a backbone virtual local area network identifier, all without learning or using customer media-access control addresses. This isolation can be to the benefit of the customer at least from a security perspective, since the media-access control addresses of the customer are generally not learned or used for frame forwarding decisions in the core of a service provider network.

SUMMARY

Devices and methods are provided for encapsulating and de-encapsulating provider backbone bridging inside upper layer protocols, substantially as illustrated by and/or described in connection with at least one of the figures, as set forth more completely in the claims.

BRIEF DESCRIPTION OF THE DRAWINGS

Certain features of the subject technology are set forth in the appended claims. However, for purpose of explanation, several embodiments of the subject technology are set forth in the following figures.

FIG. 2 illustrates the frame format for Provider Backbone Bridging.

FIG. 3A illustrates an Ethernet frame format that can be utilized for transporting a Provider Backbone Bridging packet over an Internet Protocol network, in accordance with one or more implementations of the subject technology.

FIGS. 3B-3E illustrate aspects associated with the Ethernet frame format of FIG. 3A, in accordance with one or more implementations of the subject technology.

FIG. 4 illustrates an Ethernet frame format within which a Provider Backbone Bridging packet can be transported over an Internet Protocol network, in accordance with one or more implementations of the subject technology.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations.

Figure 1:
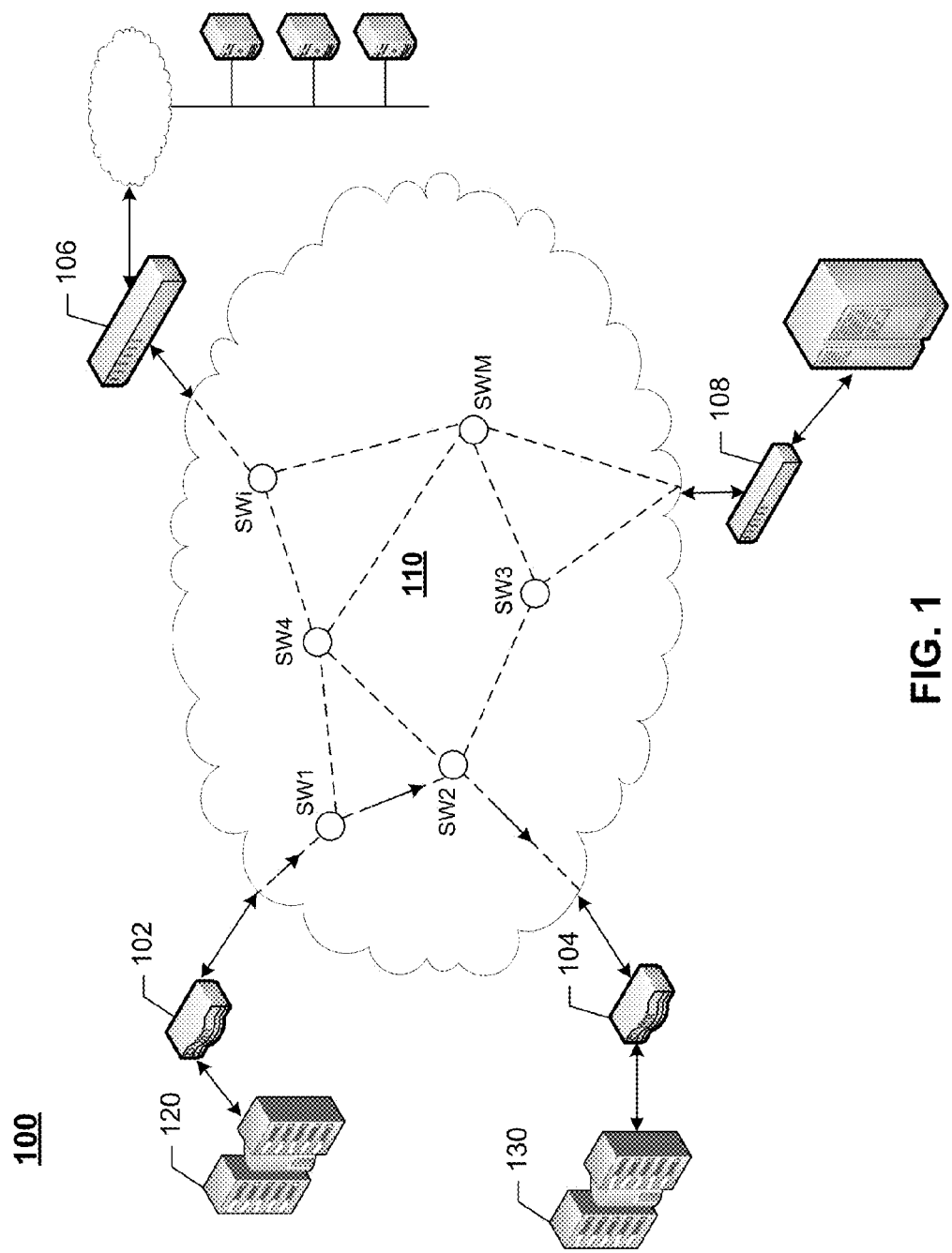
FIG. 1 illustrates an example of a network environment within which aspects of the subject technology can be implemented.

FIG. 1 illustrates an example of a network environment 100 within which aspects of the subject technology can be implemented. Examples of the network environment 100 can include a private network including a virtual local-area network (VLAN) such as a data-center network, an enterprise network, or other private networks. In one or more implementations, the network environment 100 includes an Internet Protocol (IP) network 110 and a number of endpoint devices (e.g., 102, 104, 106, 108) connected (e.g., wired or wirelessly) with the IP network 110. The IP network 110 includes a number of devices (e.g., nodes) such as multiple switches (e.g., $SW_1$, $SW_2$, . . . , $SW_M$). An endpoint device can be a source (e.g., sending endpoint device) or a destination (e.g., receiving endpoint device) of a data frame. In one or more implementations, a first endpoint device 102 is a top-of-rack switch associated with a first data center 120 and a second endpoint device 104 is a top-of-rack switch associated with a second data center 130. Frames transmitted by a source endpoint device can hop through a number of switches in the network environment 100 (e.g., the network 110) before reaching a destination endpoint device.

In one or more implementations of the subject technology, a first endpoint device 102 can receive a customer frame component of a Provider Backbone Bridging (PBB) header at an ingress port of the first endpoint device 102, where the first endpoint device 102 can perform encapsulation on the customer frame component. The customer frame component can be from a first data center 120 that is connected (e.g., wired or wirelessly) to the first endpoint device 120. The customer frame component can include a customer virtual local area network identifier (C-VID), customer destination address (C-DA), and customer source address (C-SA).

The customer frame component can be processed by one or more hardware modules and/or software modules stored in memory and processed by a processor in the first endpoint device 102. The processing of the customer frame component can include determining header information based on the C-VID within the customer frame component and the C-DA within the customer frame component. A key in the header information can be set to a predefined value associated with a Provider Backbone Bridging protocol. A backbone service instance identifier (I-SID) can be determined based on the C-VID. The header information and the I-SID can be concatenated with the customer frame component to form a frame. The frame, which is encapsulated with the customer frame component and the I-SID, can be provided to an egress port of the first endpoint device 102 for transmission, where the egress port is determined based on the header information.

In one or more implementations of the subject technology, the frame transmitted from the first endpoint device 102 can have as a destination a second endpoint device 104. The second endpoint device 104 can receive the frame at an ingress port. The second endpoint device can process the frame and provide the result of the processing to a second data center 130 that is connected (e.g., wired or wirelessly) to the second endpoint device 104. The frame can include, among other components, the customer frame component and the I-SID.

The frame can be processed by one or more hardware modules and/or software modules stored in memory and processed by a processor in the second endpoint device. The processing of the frame can include determining whether a component of a PBB header is encapsulated in the frame based on higher layer header information within the frame. The I-SID and the customer frame component can be obtained from the frame. Destination information can be determined based on the C-DA and the I-SID. The customer frame component and the I-SID can be provided to an egress port of the second endpoint device 104 for transmission, where the egress port is determined based on the destination information. The egress port can transmit the customer frame component and the I-SID to the second data center 130.

As used herein, the term "higher layer" is made with reference to layers higher than an Ethernet layer, which is considered layer 2 in the Open Systems Interconnection (OSI) model. Higher layers can therefore include a network layer and a transport layer, as well as other layers that are higher than the Ethernet layer. The term "higher layer" and "upper layer" are interchangeable for purposes of discussion.

In some aspects, the frame originating from the first endpoint device 102 can follow a path through the network environment 100, and, in particular, the network 110, that include a number of nodes. For example, a circuit between the switches $SW_1$ and $SW_3$ can include the switch $SW_2$. Any circuit can be identified by a circuit identifier (ID). Any node along the path can receive a frame, adjust the frame, and transmit the adjusted frame to a next hop (e.g., a next node or an endpoint device).

FIG. 2 illustrates the frame format 200 for PBB. The frame format 200 can be seen as including fields that can be categorized into a backbone component, a service component, and a customer frame component.

The backbone component includes, among other fields, a backbone destination media-access control (MAC) address and a backbone source MAC address, denoted as B-DA and B-SA, respectively. The backbone component also includes a 12 bit backbone virtual local area network identifier (VLAN ID or simply VID), denoted as B-VID. Accordingly, the backbone component can be associated with up to 4096 (i.e., $2^{12}$) different VLAN identifiers to differentiate traffic (e.g., with WAN identifiers between 0 and 4095). An 802.1Q tag in the backbone component contains, among other fields (not shown), a tag protocol identifier that is set to 0x88A8, which is the 802.1ad network standard.

The service component includes, among other fields, a backbone service instance tag, denoted as ITAG. The ITAG includes a 24 bit service instance identifier, denoted as I-SID. Additionally, the ITAG can contain quality of service (QoS) parameters. Traffic flows can be assigned to a different ITAG for each customer, and the QoS can be provided on a per customer basis. In one or more implementations, utilization of a 24 bit I-SID can improve scalability of Provider Ethernet networks by allowing $2^{24}$ isolated (e.g., different) service instances. An EtherType field in the service component is set to 0x88E7, which is the 802.1ah-2008 network standard, also referred to as PBB or Mac-in-Mac. The ITAG can also contain discard eligible indicator (DEI), priority code point (PCP), and no customer address (NCA) fields. For example, the NCA field provides a mechanism to exchange operations, administration, maintenance (OAM) messages within customer endpoints that utilize a common encapsulation method.

The customer frame component includes, among other fields, a customer destination MAC address (C-DA), customer source MAC address (C-SA), customer virtual local area network identifier (C-VID), and customer payload. An 802.1Q tag in the customer frame component contains, among other fields (not shown), a tag protocol identifier that is set to 0x8100, which is the 802.1Q network standard.

In accordance with one or more implementations of the subject technology, methods and systems for encapsulating a customer frame component of a PBB header into an IP packet or a transport layer protocol segment are provided. Methods and systems for de-encapsulating the customer frame component are also provided. In any implementation, information in the service component of the PBB frame format 200, such as the I-SID, can be utilized to allow service isolation among different customer domains across an IP network as well as utilized to provide connectivity between hosts of the same customer domains across an IP network. The methods and systems can be utilized with IPv4 or IPv6 packets. In one or more implementations, the methods and systems can be utilized with transport layer protocol segments.

FIG. 3A illustrates an Ethernet frame format 300 that can be utilized for transporting a PBB packet over an IP network, in accordance with one or more implementations of the subject technology. The Ethernet frame format 300 includes an Ethernet header 302, an IP header 304, a transport layer header 306, a PBB packet 308, and a frame check sequence (FCS) 310. The FCS 310 is a checksum that is utilized for error detection. Accordingly, as shown in FIG. 3A, in one or more implementations of the subject technology, the PBB packet 308 is contained/carried in a payload of the transport layer protocol segment, where the PBB packet 308 can include the I-SID and the customer frame component (e.g., shown in FIG. 2), among other fields.

Specifically, it is noted that in FIG. 3A the Ethernet header 302 can be considered to have as its payload the IP header 304, the transport layer header 306, and the PBB packet 308. The Ethernet layer associated with the Ethernet header 302 is generally considered a lower layer that encapsulates the higher layers (e.g., IP layer and transport layer). Relative to the Ethernet layer, the IP layer and the transport layer are considered to be higher layers. Similarly, the IP header 304 can be considered to have as its payload the transport layer header 306 and the PBB packet 308. Relative to the IP layer, the transport layer is considered to be a higher layer. The transport layer header 306 can be considered to have as its payload the PBB packet 308.

FIGS. 3B-3E illustrate aspects associated with the Ethernet frame format 300, in accordance with one or more implementations of the subject technology. FIG. 3B illustrates the Ethernet header 302 shown in FIG. 3A. The Ethernet header 302 includes, among other fields, a destination MAC address (DA), a source MAC address (SA), and virtual local area network tags (VLANs). An 802.1Q tag, associated with the VLANs, contains, among other fields (not shown) a tag protocol identifier that is set to 0x8100, which is the 802.1Q network standard. An EtherType field is set to 0x0800, which is the IP version 4 (IPv4) protocol, indicating that the IPv4 protocol is encapsulated as part of the payload of the Ethernet header 302. In one or more implementations, the EtherType field can be set instead to 0x86DD, which is the IP version 6 (IPv6) protocol.

FIG. 3C illustrates the IP header 304 shown in FIG. 3A. In particular, FIG. 3C illustrates an IPv4 packet header. The IP header 304 includes, among other fields, a version field 320, a protocol field 322, an IP source address (IP-SIP) field 324, and an IP destination address (IP-DIP) field 326. The version field 320 identifies the IP header 304 as IPv4 (e.g., version 4). The protocol field 322 is a demultiplexing key that identifies the higher layer protocol to which the IP packet should be passed. The IP-SIP field 324 indicates the IP address of a source node (e.g., a first endpoint device 102 in FIG. 1) that is initiating transmission of a frame that contains the PBB packet 308 over IP inside a transport layer protocol segment. The IP-DIP field 326 indicates the IP address of a destination node (e.g., a second endpoint device 104 in FIG. 1) that is terminating the transmission. In accordance with any implementation, the source node can encapsulate the PBB packet 308 and the destination node can de-encapsulate a frame that contains the PBB packet 308. It is noted that, in one or more implementations, an IPv6 header (not shown) can be utilized as the IP header 304.

In one or more implementations, the higher layer protocol indicated in the protocol field 322 is the transport layer protocol associated with the transport layer header 306. Accordingly, the protocol field 322 indicates UDP as the higher layer protocol in one or more implementations. Alternatively, the protocol field 322 can indicate TCP as the higher-layer protocol. For example, TCP can be used for connection oriented service. In such a case, endpoint devices (e.g., 102 and 104 in FIG. 1) initiate a TCP session between the endpoint devices prior to transmitting frames between the endpoint devices.

FIG. 3D illustrates the transport layer header 306 shown in FIG. 3A. In particular, FIG. 3D illustrates a UDP header. The UDP header includes a source port field 330 and a destination port field 332. The source port field 330 indicates the port of a source node (e.g., a first endpoint device 102 in FIG. 1) that is initiating transmission of a frame that contains the PBB packet 308 over IP inside the UDP segment. The destination port field 332 indicates port of a destination node (e.g., a second endpoint device 104 in FIG. 1) that is terminating the transmission.

In one or more implementations, the destination port field 332 indicates that the payload of the UDP header 304 is a PBB packet. The destination port field 332 can contain a value of 0x88E7, which is the 802.1ah-2008 network standard (also referred to as PBB or Mac-in-Mac), or any programmable value that can be used to indicate presence of the PBB packet inside the UDP header 304. The source node that performs encapsulation and the destination node that performs de-encapsulation can be set to recognize the value in the destination port field as indicating that presence of the PBB packet inside the UDP header 304. Alternatively, in one or more implementations, a TCP header (not shown) can be utilized as the transport layer header 306.

In one or more implementations, the source port field 330 carries an entropy value that can be computed based on one or more of C-DA, C-SA, C-VID, IP-SIP, IP-DIP, and any other customer payload fields depending upon deployment needs. The source port field 330 can be used in hashing by intermediate nodes (e.g., switches, routers, core routers), where the intermediate nodes are capable of hashing over a transport layer protocol 5-tuple. In any implementation, the transport layer protocol 5-tuple generally includes the transport layer utilized (e.g., UDP in this case), IP-SIP, IP-DIP, source port, and destination port.

FIG. 3E illustrates the PBB packet 308 shown in FIG. 3A, in accordance with one or more implementations of the subject technology. The PBB packet 308 includes the backbone service instance tag (ITAG), customer destination MAC address (C-DA), customer source MAC address (C-SA), customer virtual local area network identifier (C-VID), and customer payload, as also shown in FIG. 2.

As provided above with reference to FIGS. 3A-3E, in one or more implementations, the PBB packet 308 can be transported over IPv4 inside a UDP segment from a first end switch to a second end switch. Alternatively, in one or more implementations, the PBB packet 308 can be transported over IPv4 inside a TCP segment or IPv6 inside a transport layer segment (e.g., UDP or TCP).

FIG. 4 illustrates an Ethernet frame format 400 within which a PBB packet 408 can be transported over an IP network, in accordance with one or more implementations of the subject technology. The Ethernet frame format 400 includes an Ethernet header 402, an IP header 404, a PBB packet 408, and a frame check sequence (FCS) 410. In one or more implementations, the Ethernet header 402, the IP header 404, and the PBB packet 408 have similar fields to those shown in FIGS. 3B, 3C, and 3E, respectively.

Accordingly, as shown in FIG. 4, in one or more implementations of the subject technology, the PBB packet 408 is contained/carried inside an Ethernet frame format 400 that includes an IP header 404 but is devoid of a transport layer protocol header. Such an Ethernet frame format can be utilized, for example, in applications involving less stringent characteristics of load balancing. In one or more implementations, the PBB packet 408 can be transported over IPv4 from a source node to a destination node. In alternative implementations, the PBB packet 408 can be transported over IPv6 from the source node to the destination node.

In one or more implementations, a protocol field (e.g., 322 in FIG. 3C) of the IP header 404 indicates that the payload of the IP header 404 contains a PBB packet 408. The protocol field can contain a value of 0x88E7, which is the 802.1ah-2008 network standard (also referred to as PBB or Mac-in-Mac), or any programmable value that can be used to indicate presence of the PBB packet 408 inside the IP header 404. The source node that performs encapsulation and the destination node that performs de-encapsulation can be set to recognize the value in the destination port field as indicating that presence of the PBB packet 408 inside the IP header 404.

Figure 5:
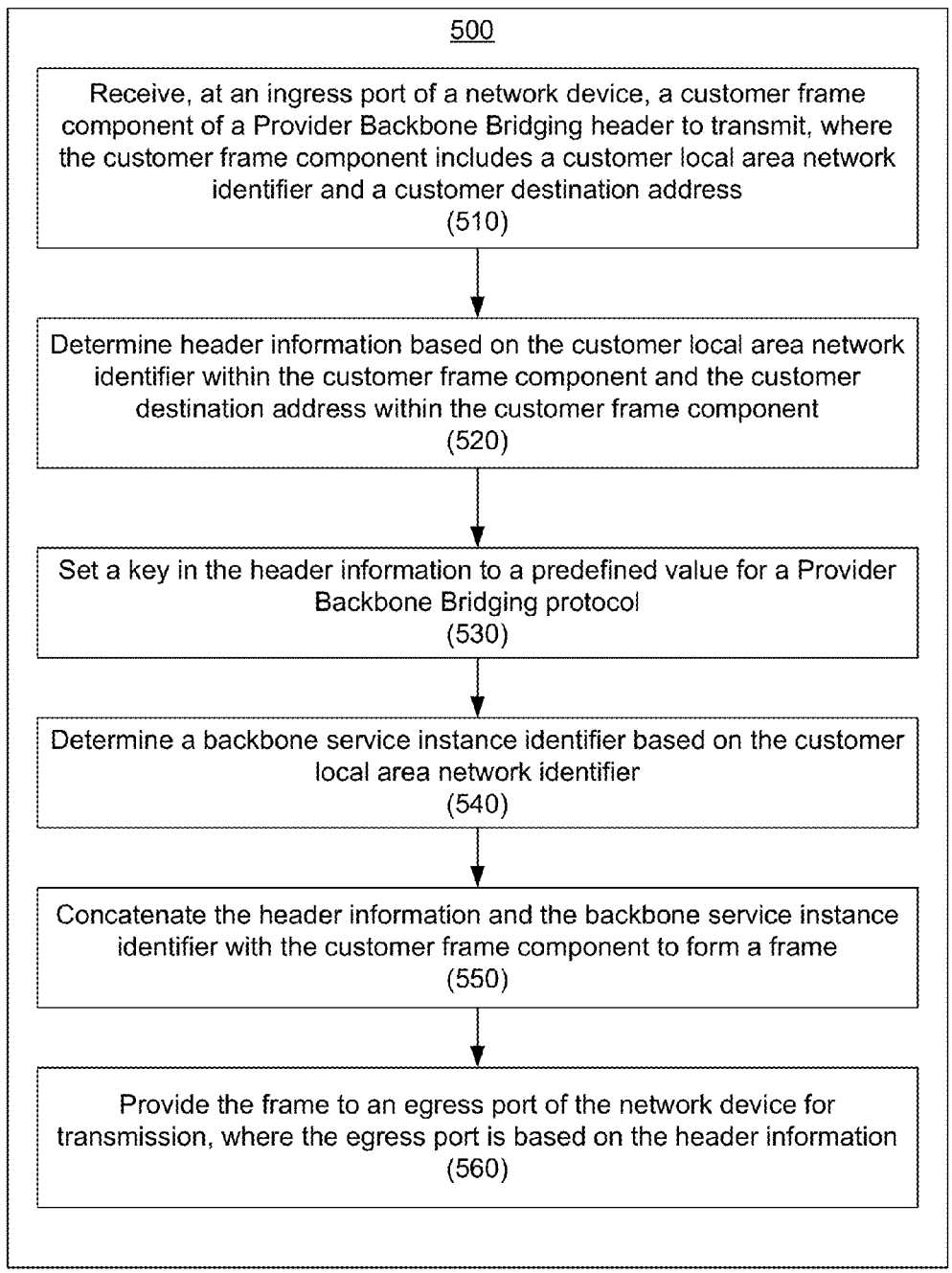
FIG. 5 shows a flowchart illustrating an example process for encapsulating a customer frame component of a Provider Backbone Bridging header, in accordance with one or more implementations of the subject disclosure.

FIG. 5 shows a flowchart illustrating an example process 500 for encapsulating a customer frame component of a PBB header, in accordance with one or more implementations of the subject disclosure. The steps of the process 500 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously.

A customer frame component to be transmitted is received (510) at an ingress port of a network device. For example, the customer frame component can be received at an ingress port of a first end switch (e.g., 102 in FIG. 1). In accordance with one or more implementations, the customer frame component is a part of a Provider Backbone Bridging header and includes, among other fields, a customer virtual local area network identifier (C-VID), a customer destination MAC address (C-DA), and a customer source MAC address (C-SA). In one or more implementations, an ingress admissions check can be performed by the first end switch (e.g., 102 in FIG. 1) to make sure that the customer frame component has been received on a port that is enabled for a particular encapsulation.

Header information is determined based on the C-VID within the customer frame component and the C-DA within the customer frame component (520). The header information provides details including destination information regarding which egress port of the first end switch to send out a frame formed from encapsulating the customer frame component. The header information also provides details including Ethernet header information (e.g., DA and SA in FIG. 3B) and IP header information (e.g., IPv4 SIP and IPv4 DIP in FIG. 3C). In one or more implementations, the header information also provides including transport layer header information (e.g., UDP source port and UDP destination port in FIG. 3D).

In one or more implementations, the header information can be determined as follows. An internal service identifier (ID) can be derived based on an identifier of the ingress port of the network device and the C-VID. For example, a lookup table can be used with the identifier of the ingress port and the C-VID as a key (e.g., demultiplexing key) to obtain the internal service ID. With the internal service ID, a lookup table can be used with the internal service ID and C-DA as a key, and results from the lookup table provide the header information. It is noted that relative to the I-SID, which is a 24 bit field, the internal service ID can be less than 24 bits, more than 24 bits, or 24 bits. However, a one-to-one mapping is generally provided between the I-SID and internal service ID.

A higher layer key in the header information is set to a value that is predefined for a PBB protocol (530). In one or more implementations, a higher layer protocol data unit is an Internet Protocol (IP) packet and the header information includes a header of the IP packet. The higher layer key can be set in the header of the IP packet, such as in a protocol field (e.g., 322 in FIG. 3C) of the IP header (e.g., 304, 404). In one or more implementations, the higher layer protocol data unit can be a transport layer segment and the header information further includes a header of the transport layer. The higher layer key can be set in the header of the transport layer segment, such as in a destination port field (e.g., 332 in FIG. 3D) of the transport layer header. Example transport layer segments include a UDP segment and a TCP segment.

A backbone service instance identifier (I-SID) is determined based on the customer local area network identifier (540). In one or more implementations, the I-SID can be determined by performing a table lookup using the internal service ID as a key. A result of the table lookup provides a 24 bit I-SID as output. In one or more implementations, other fields in the ITAG can also be determined.

The header information and the I-SID are concatenated with the customer frame component to form a frame (550). The header information can contain a field that is set by the higher layer key to a predefined value for PBB. The header information can be utilized to generate the Ethernet header and the IP header. Additionally, in one or more implementations, the header information can also be utilized to generate the transport layer header. In one or more implementations, concatenating of the header information and the I-SID with the customer frame component can include attaching the I-SID and the customer frame component as a payload of the header information (e.g., IP header, transport layer header).

The frame that is formed is provided for transmission to an egress port of the network device (560), where the egress port to which the frame is provided is based on the header information.

Figure 6:
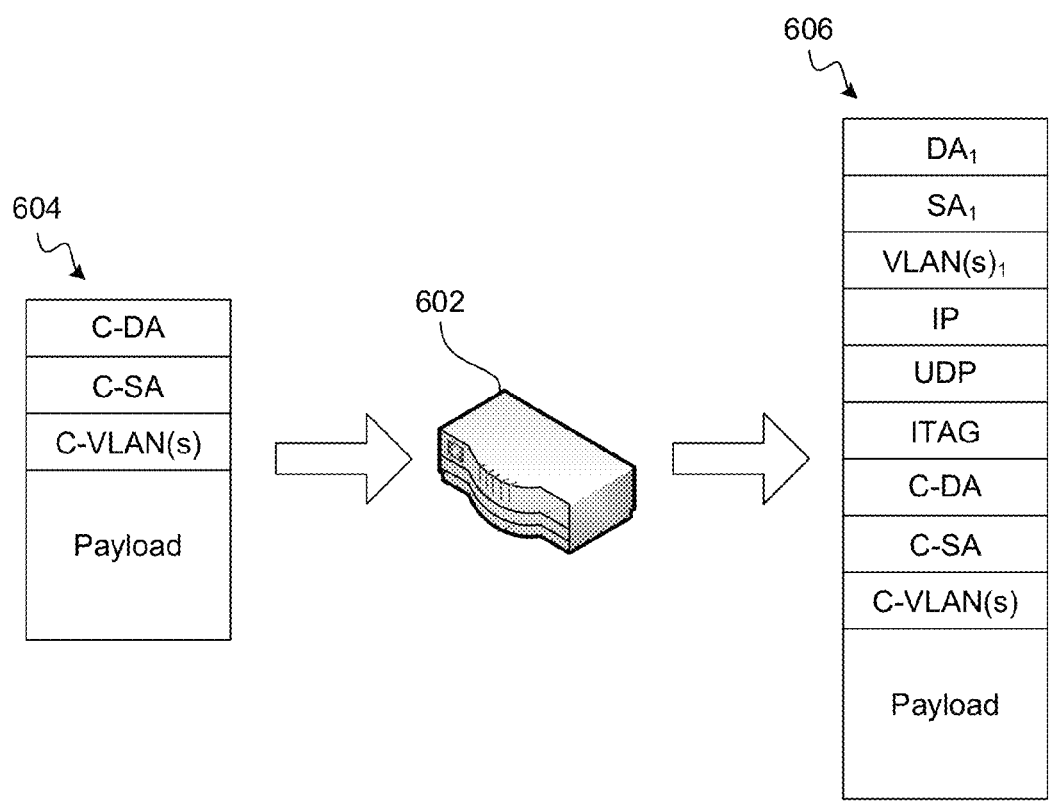
FIG. 6 shows an encapsulation process performed by a first end switch upon receipt of a customer frame component of a Provider Backbone Bridging header to form a frame, in accordance with one or more implementations of the subject disclosure.

FIG. 6 shows an encapsulation process performed by a first end switch 602 (e.g., 102 in FIG. 1) upon receipt of a customer frame component 604 of a PBB header to form a frame 606, in accordance with one or more implementations of the subject disclosure. The customer frame component 604 can be received at an ingress port of the first end switch 602. In one or more implementations, the first end switch 602 can perform the process 500 provided in FIG. 5.

As previously shown in FIG. 2 and again in FIG. 6, the customer frame component 604 includes a customer local area network identifier (C-VLAN), a customer destination MAC address (C-DA), and a customer source MAC address (C-SA). Header information associated with a higher layer (e.g., IP, UDP, TCP) and the Ethernet layer (e.g., $DA_1$, $SA_1$, $VLAN(s)_1$) can be determined based on the C-VLAN and C-DA, where the term "higher layer" is relative to the Ethernet layer. Backbone service instance identifier (I-SID) can be determined based on the C-VLAN. In one or more implementations, the customer frame component 604 and the ITAG, which includes the I-SID, form a PBB packet.

In a higher layer header, such as in the IP header or in the transport layer protocol header, a key (e.g., a demultiplexing key or higher layer key) is set to a predefined value that identifies the frame 606 as including the PBB packet. With reference to FIG. 6, the key can be set in the UDP destination port field of the UDP header. The customer frame component 602 is encapsulated by combining the header information, the demultiplexing key, and the I-SID to the customer frame component to form the frame 606. In one or more implementations, the PBB packet is sent over IP. In one or more implementations, the PBB packet is sent over IP inside a transport layer protocol header (e.g., UDP, TCP).

In one or more implementations, an ingress admissions check can be performed by the first end switch (e.g., 102 in FIG. 1) to make sure that the customer frame component has been received on a port that is enabled for a particular encapsulation. A port of the first end switch that receives the customer frame component, referred to as an incoming port or ingress port, generally has a configuration field that specifies whether the port can be set or enabled to perform a particular encapsulation. For example, a first ingress port of the first end switch can be able to perform an encapsulation of the customer frame component in IP but not in UDP/IP whereas a second ingress port of the first end switch can be able to perform an encapsulation of the customer frame component in IP and in UDP/IP.

Consider that an ingress port A of the first end switch receives two customer frame components, a first customer frame component with fields $C-SA_1$, $C-DA_1$, $C-VLAN_1$ and a second customer frame component with fields $C-SA_2$, C-DA$_2$, C-VLAN$_2$. Furthermore, consider that the ingress port A is enabled to perform encapsulation in IP and UDP/IP.

For the first customer frame component, an internal service identifier ISD$_1$ can be derived based on port of ingress of the customer frame component (in this case, port A) and C-VLAN$_1$. In one or more implementations, the ISD$_1$ is derived by performing a lookup utilizing the port of ingress and C-VLAN$_1$ as a key. An outgoing or egress port of the first end switch and a next hop (e.g., switch SW$_1$ in FIG. 1) can be determined based on a lookup utilizing C-DA$_1$ and IDS$_1$ as a key. Consider that the egress port is port B and a next hop is NH$_1$. NH$_1$ will have a configuration field that indicates which encapsulation can be accepted by NH$_1$. Consider that NH$_1$ is enabled to accept encapsulation in IP. The customer frame packet will be encapsulated in the first end switch in IP and provided to egress port B for transmission to NH$_1$.

For the second customer frame component, an internal service identifier ISD$_2$ can be derived based on port of ingress of the customer frame component (in this case, port A) and C-VLAN$_2$. In one or more implementations, the ISD$_2$ is derived by performing a lookup utilizing the port of ingress and C-VLAN$_2$ as a key. An outgoing or egress port and a next hop can be determined based on a lookup utilizing C-DA$_2$ and IDS$_2$ as a key. Consider that the egress port is port B (same as with the first customer frame component) and a next hop is NH$_2$. NH$_2$ will have a configuration field that indicates which encapsulation can be accepted by NH$_2$. Consider that NH$_2$ is enabled to accept encapsulation in UDP. The customer frame packet will be encapsulated in the first end switch in UDP and provided to egress port B for transmission to NH$_2$.

Figure 7:
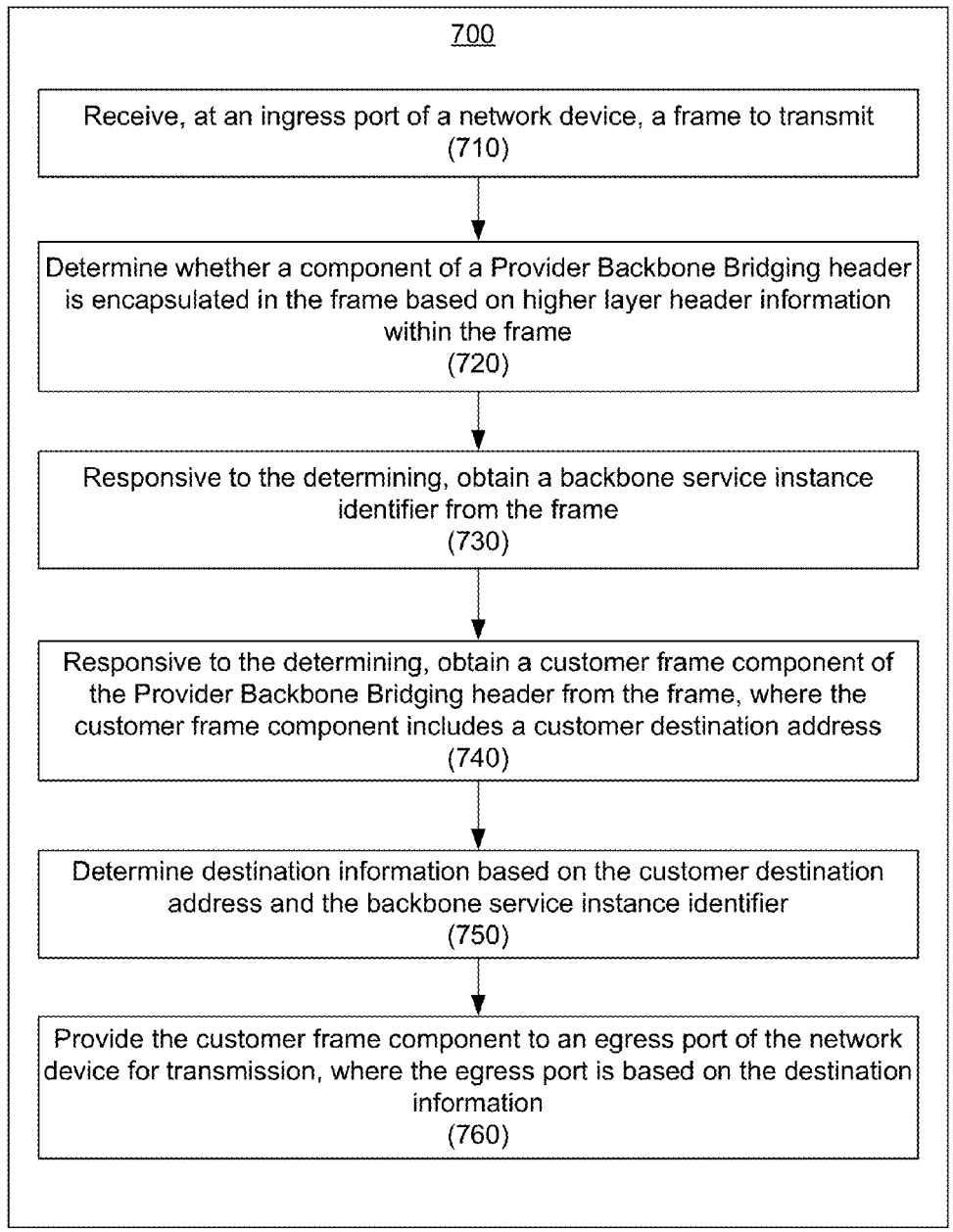
FIG. 7 shows a flowchart illustrating an example process for de-encapsulating a frame, in accordance with one or more implementations of the subject disclosure.

FIG. 7 shows a flowchart illustrating an example process 700 for de-encapsulating a frame, in accordance with one or more implementations of the subject disclosure. The steps of the process 700 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously.

A frame to be transmitted is received at an ingress port of a network device (710). For example, the frame can be received at an ingress port of a second end switch (e.g., 104 in FIG. 1). In accordance with one or more implementations, the frame encapsulates a PBB packet (e.g., 308 in FIG. 3A). In one or more implementations, the example process 500 can be used to form the frame.

A determination is made as to whether a component of a PBB header (e.g., a PBB packet such as 308 in FIG. 3A) is encapsulated in the frame based on higher layer header information within the frame (720). In one or more implementations, the higher layer header information utilized in the determination includes an IP header (e.g., 304 in FIG. 3A) within the frame. In one or more implementations, the higher layer header information utilized in the determination includes a transport layer header (e.g., 306 in FIG. 3A) within the frame.

In one or more implementations, the frame is analyzed in order to make the determination. To analyze the frame, the frame can be parsed to check for a higher layer key set in the frame to indicate that a component of a PBB header is encapsulated in the frame. In some implementations, the higher layer key can be set in the protocol field (e.g., 322 in FIG. 3C) of an IP header. In other implementations, the higher layer key can be set in the destination port field (e.g., 332 in FIG. 3D) of a transport layer header.

Additionally, in one or more implementations, a determination is made as to whether to perform de-encapsulation (e.g., terminate the encapsulation). If a destination MAC address (e.g., DA$_n$) in the received frame matches MAC address of the node, a lookup can be performed using one of the following keys: keys as an identifier associated with the ingress port, the incoming virtual local area network identifier (VLAN$_n$), IP-SIP, and IP-DIP; keys as VLAN$_n$, IP-SIP, and IP-DIP; keys as IP-SIP and IP-DIP; and key as IP-DIP. The lookup result indicates whether to perform de-encapsulation. If the lookup result indicates that de-encapsulation should be performed, Ethernet header and IP header in the received frame can be removed. In one or more implementations where the received frame includes a transport layer header, the transport layer header can also be removed. Providing of different options for the keys can provide flexibility in determining when to perform de-encapsulation. For example, some implementations can determine when to perform de-encapsulation based on checking only IP-DIP, other implementations can determine when to perform de-encapsulation based on checking IP-DIP and IP-SIP, and still other implementations can use other keys.

In response to the determination as to whether a component of a PBB header is encapsulated in the frame (720), a backbone service instance identifier (I-SID) is obtained from the frame (730) and a customer frame component of the PBB header is obtained from the frame (740). The customer frame component includes a customer destination address (C-DA), customer source address (C-SA), and customer virtual local area network identifier (C-VID). In one or more implementations, the obtaining of the I-SID and the customer frame component from the frame are performed by parsing the received frame. Alternatively, the obtaining of the I-SID and the customer frame component from the frame can be performed by parsing a frame from which one or more headers (e.g., Ethernet header, IP header, transport layer header) have been removed.

Destination information is determined based on the C-DA and the I-SID (750) that were obtained from the received frame. The destination information provide details as to which port the customer frame component and the I-SID are to be provided and, accordingly, can also be referred to as forwarding information. In one or more implementations, an internal service identifier (ID) is determined by performing a lookup using one of the following as keys: keys as I-SID and SIP; and key as I-SID. The destination information can be based on the C-DA and the internal service ID. In one or more implementations, the destination information can be determined by performing a lookup using the C-DA and internal service ID as keys.

The customer frame component is provided to an egress port of the network device for transmission (760), where the egress port to which the customer frame component is provided is based on the destination information. For example, in a case where the network device is a second end switch (e.g., 104 in FIG. 1), the egress port can transmit the customer frame component to a second data center (e.g., 130 in FIG. 1) associated with the second end switch. In one or more implementations, the customer frame component and the I-SID can be referred to as a PBB packet (e.g., 308 in FIG. 3A).

Figure 8:
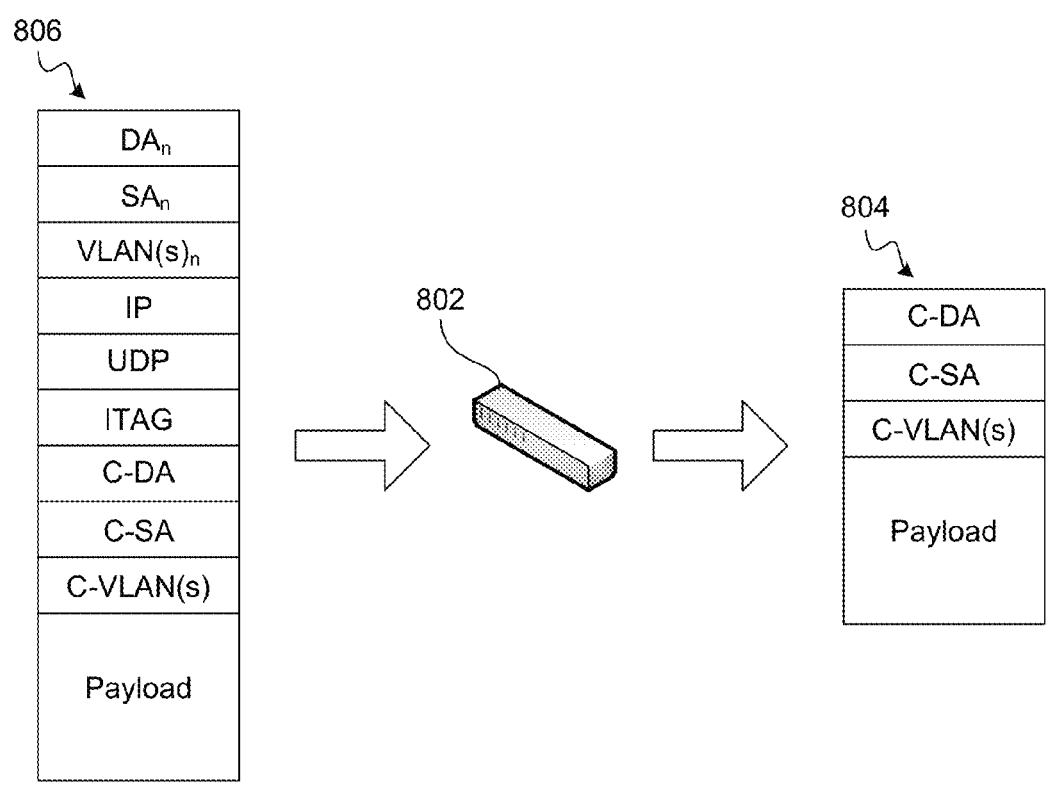
FIG. 8 shows a de-encapsulation process performed by a second end switch upon receipt of a frame encapsulated by the first end switch of FIG. 6, in accordance with one or more implementations of the subject disclosure.

FIG. 8 shows a de-encapsulation process performed by a second end switch 802 (e.g., 104 in FIG. 1) upon receipt of a frame 806 encapsulated by the first end switch 602 of FIG. 6, in accordance with one or more implementations of the subject disclosure. It is noted that the frame 806 in FIG. 8 is generally not the same frame as frame 606 in FIG. 6. In one or more implementations, the frame 606 is adjusted with each hop through the network environment (e.g., 100 in FIG. 1). The frame 806 can be received at an ingress port of the second end switch 802. In one or more implementations, the second end switch 802 can perform the process 700 provided in FIG. 7.

In one or more implementations, an ingress admissions check can be performed by the second end switch 802 to make sure that the frame 806 has been received on a port that is enabled for a particular de-encapsulation. A determination is made as to whether a PBB packet is encapsulated in the frame 806 based on the higher layer header information (e.g., information in IP and UDP). In one or more implementations, the frame 806 can be parsed to check for a key that is set in the frame 806 to indicate that a component of a PBB header is encapsulated in the frame 806. The key is set in the destination port field of the UDP header.

Additionally, in one or more implementations, a determination is made as to whether to perform de-encapsulation (e.g., terminate the encapsulation). If a destination MAC address (e.g., $DA_n$) in the received frame matches MAC address of the second end switch 802, a lookup can be performed using one of the following keys: keys as the ingress port, $VLAN_n$, IP-SIP, and IP-DIP; keys as $VLAN_n$, IP-SIP, and IP-DIP; keys as IP-SIP and IP-DIP; and key as IP-DIP. The lookup result indicates whether to perform de-encapsulation. If the lookup result indicates that de-encapsulation should be performed, the Ethernet header, IP header, and UDP in the frame 806 are removed.

A backbone service instance identifier (I-SID) is obtained from the frame 806 and a customer frame component of the PBB header is obtained from the frame 806. Destination information is determined based on the C-DA and the I-SID. The customer frame component 804 is provided to an egress port of the second end switch 802 for transmission, where the egress port to which the customer frame component is provided is based on the destination information.

Figure 9:
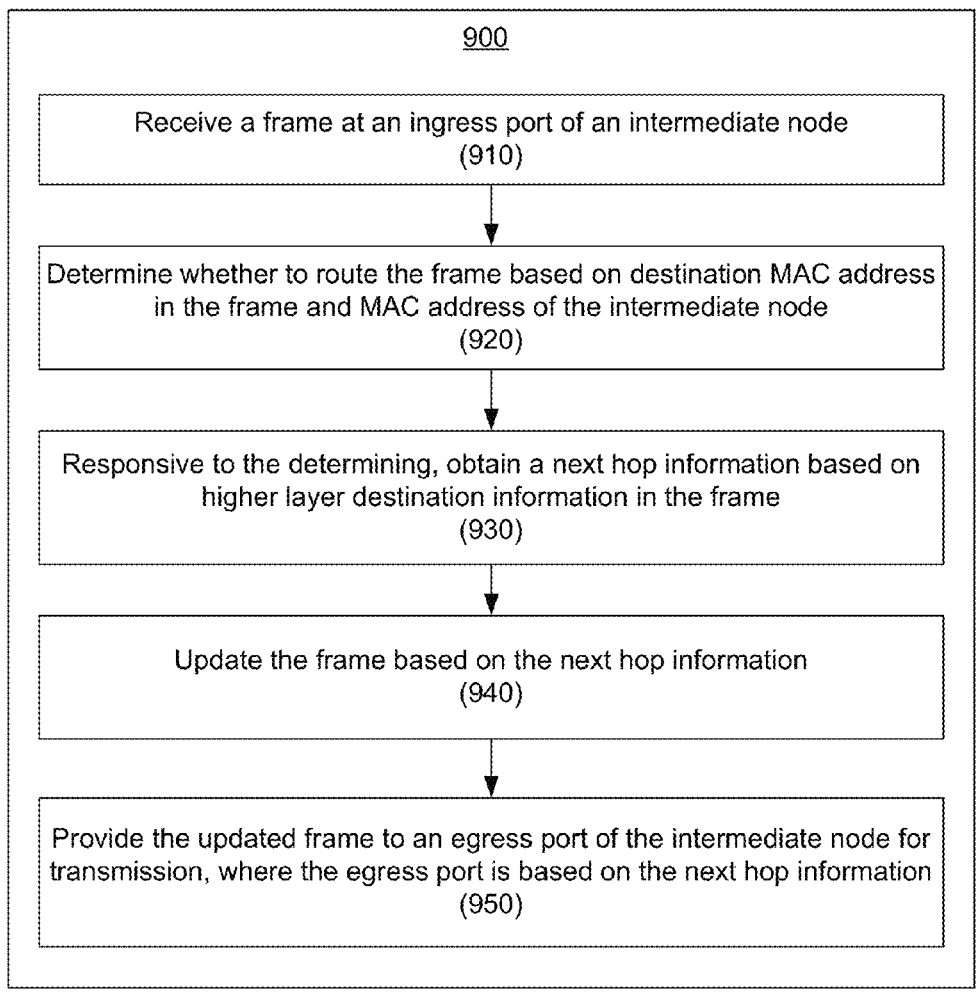
FIG. 9 shows a flowchart illustrating an example process for routing a frame.

FIG. 9 shows a flowchart illustrating an example process 900 for routing a frame. In one or more implementations, the frame contains a PBB packet (e.g., 308 in FIG. 3A). The steps of the process 900 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously.

The frame to be routed is received at an intermediate node (910), such as an intermediate switch or router (e.g., SW1 in FIG. 1) that connects (directly or indirectly) the first end switch and the second end switch.

The intermediate node determines whether to route the frame based on a destination MAC address (e.g., $DA_1$) in the frame and a MAC address of the intermediate node (920).

Responsive to the determining, next hop information is obtained based on higher layer destination information in the frame (930). The next hop information provides details including which egress port of the intermediate node to send out a frame and Ethernet header information to be used in updating the received frame. The Ethernet header information includes DA, SA, and VLAN. In one or more implementations, the next hop information is obtained when the destination MAC address matches the MAC address of the intermediate node, indicating that the frame is to be routed by the intermediate node. The higher layer destination is provided by IP-DIP in the frame. The next hop information is obtained by performing a table lookup using the IP-DIP.

In one or more implementations, the lookup result gives a destination as equal-cost multi-path (e.g., ECMP), where multiple paths are determined by the routing to have an equal cost. In such implementations, a hashing result based on IP-Protocol (e.g., IPv4, IPv6), IP-SIP, IP-DIP, transport layer destination port (e.g., UDP or TCP destination port), and transport layer source port (e.g., UDP or TCP source port) can be utilized to resolve which route among EMCP to select.

The received frame is updated based on the next hop information (940) to form an updated frame. Fields of the Ethernet header information of the received frame (e.g., $DA_1$, $SA_1$, $VLAN_1$) are changed to those corresponding to the next hop (e.g., $DA_2$, $SA_2$, $VLAN_2$).

The updated frame is provided to an egress port of the intermediate node for transmission (950), where the egress port to which the update frame is provided is based on the next hop information.

Figure 10:
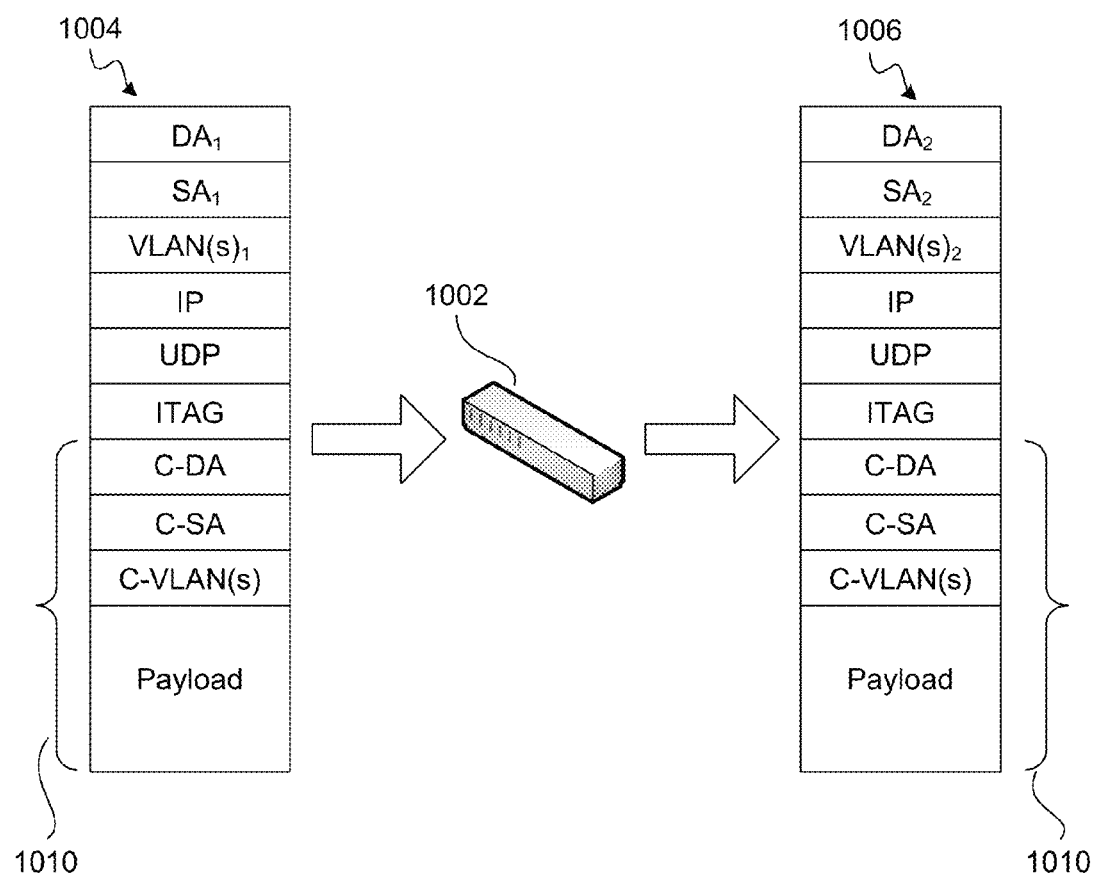
FIG. 10 shows transit flow of a frame through an intermediate router.

FIG. 10 shows transit flow of a frame 1004 through an intermediate router 1002 (e.g., $SW_1$ in FIG. 1). The frame 1004 to be routed is received at an ingress port of the intermediate router 1002, where the intermediate router 1002 connects (directly or indirectly) the first end switch (e.g., 602 in FIG. 6) with the second end switch (e.g., 802 in FIG. 8). In one or more implementations, an ingress admissions check can be performed by the intermediate router 1002 to make sure that the frame 1004 has been has been received on a port that is enabled for routing the frame 1004.

If a destination MAC address (e.g., $DA_1$) in the frame 1004 matches a MAC address of the intermediate router 1004, the intermediate router 1004 routes the frame 1004. Next hop information is obtained based on higher layer destination information in the frame 1004. In one or more implementations, the higher layer destination information is the IP-DIP in the IP header. The next hop information (e.g., $DA_2$, $SA_2$, $VLAN_2$) is obtained by performing a table lookup using the IP-DIP. The Ethernet header information of the frame 1004 is replaced/updated with the next hop information to form an updated frame 1006. The updated frame is provided for transmission to an egress port of the intermediate router 1004, where the egress port to which the update frame is provided is based on the next hop information.

The frame undergoes routing through an IP network, where adjustments are made for example to the Ethernet header information of the frame with each hop, until the frame reaches the second end switch (e.g., 104 in FIG. 1). At each hop of the routing, the customer frame component 1010 is generally transparent to the IP network. As previously indicated, intermediate switches can perform switching/forwarding of the frame based on VLAN and without learning or using customer MAC addresses in the customer frame component 1010. This isolation can be to the benefit of the customer at least from a security perspective, since the MAC addresses of the customer are generally not learned or used for frame forwarding decisions in the core of a service provider network.

At the second end switch (e.g., 104 in FIG. 1), the encapsulated frame undergoes de-encapsulation to obtain the customer frame component 1010 from the frame 1006. The customer frame component 1010 can then be forwarded by the second end switch to a destination within the second data center (e.g., 130 in FIG. 1) associated with the second end switch. Destination information can be determined based on the C-DA and the I-SID.

Figure 11:
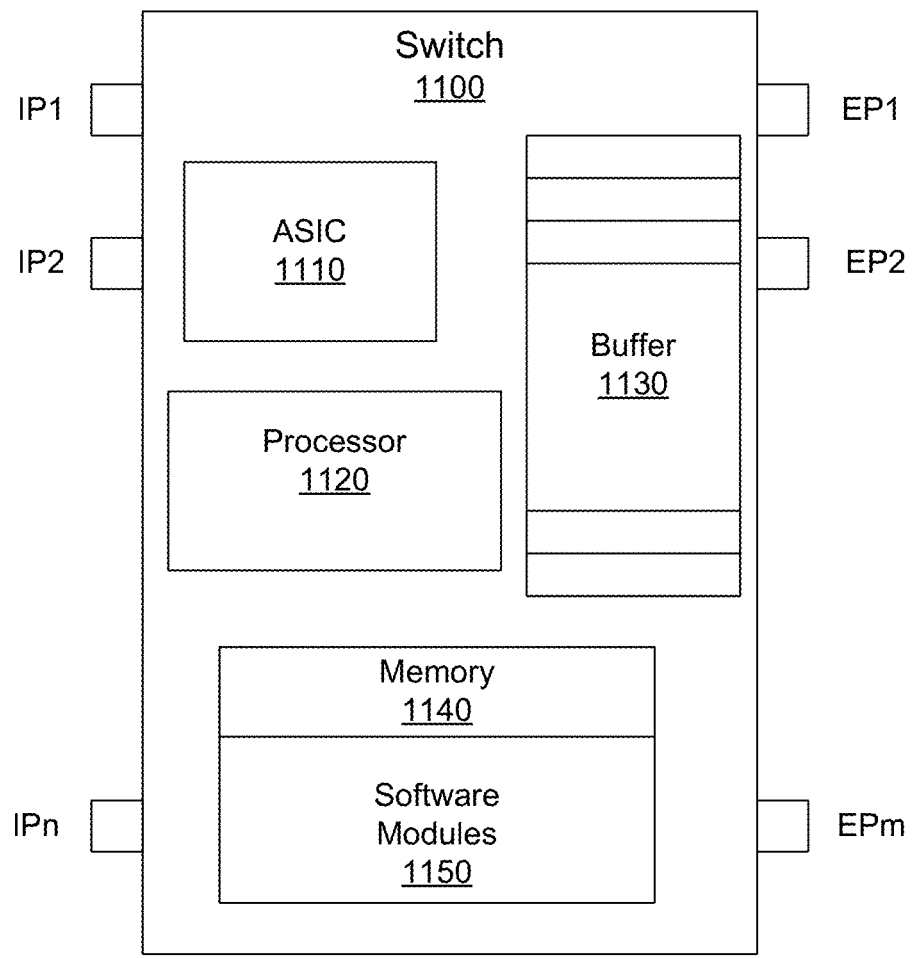
FIG. 11 illustrates an example of a switch, in accordance with one or more implementations of the subject technology.

FIG. 11 illustrates an example of a switch 1100, in accordance with one or more implementations of the subject technology. The switch 1100 can perform encapsulation and/or de-encapsulation, such as performed by the first end switch 602 and the second end switch 802 in FIGS. 6 and 8, respectively. Alternatively on in conjunction, the switch 1100 can perform routing, such as the intermediate router 1002 in FIG. 10.

The switch 1100 includes a number of ingress (input) ports $IP_1$-$IP_n$ and multiple egress (output) ports $EP_1$-$EP_m$. The switch 1100 can further include hardware components such as an application specific integrated circuit (ASIC) 1110, which in some aspects can be implemented as a field-programmable logic array (FPGA), a processor 1120, buffer 1130, and memory 1140. The ASIC 1110 can perform encapsulation processes, de-encapsulation processes, and/or routing processes, such as processes 500, 700, and 900 in FIGS. 5, 7, and 9, respectively. Examples of the processor 1120 can include a general-purpose processor, a processor core, a multi-core processor, a controller, or other types of processor.

The buffer 1130 can include one or more queues of the outgoing frames. Each queue can correspond to an egress port (e.g., one of $EP_{1-Epm}$). Examples of the memory 1140 can include RAM, DRAM, SRAM, T-RAM, Z-RAM, TTRAM, or any other storage media. The memory 1140 can include software modules 1150 that when executed by a processor (e.g., processor 1120) can perform some or all of the functionalities of the ASIC 1110, which can be included in the software module 1150 or stored in another storage and executed by a processor.

Figure 12:
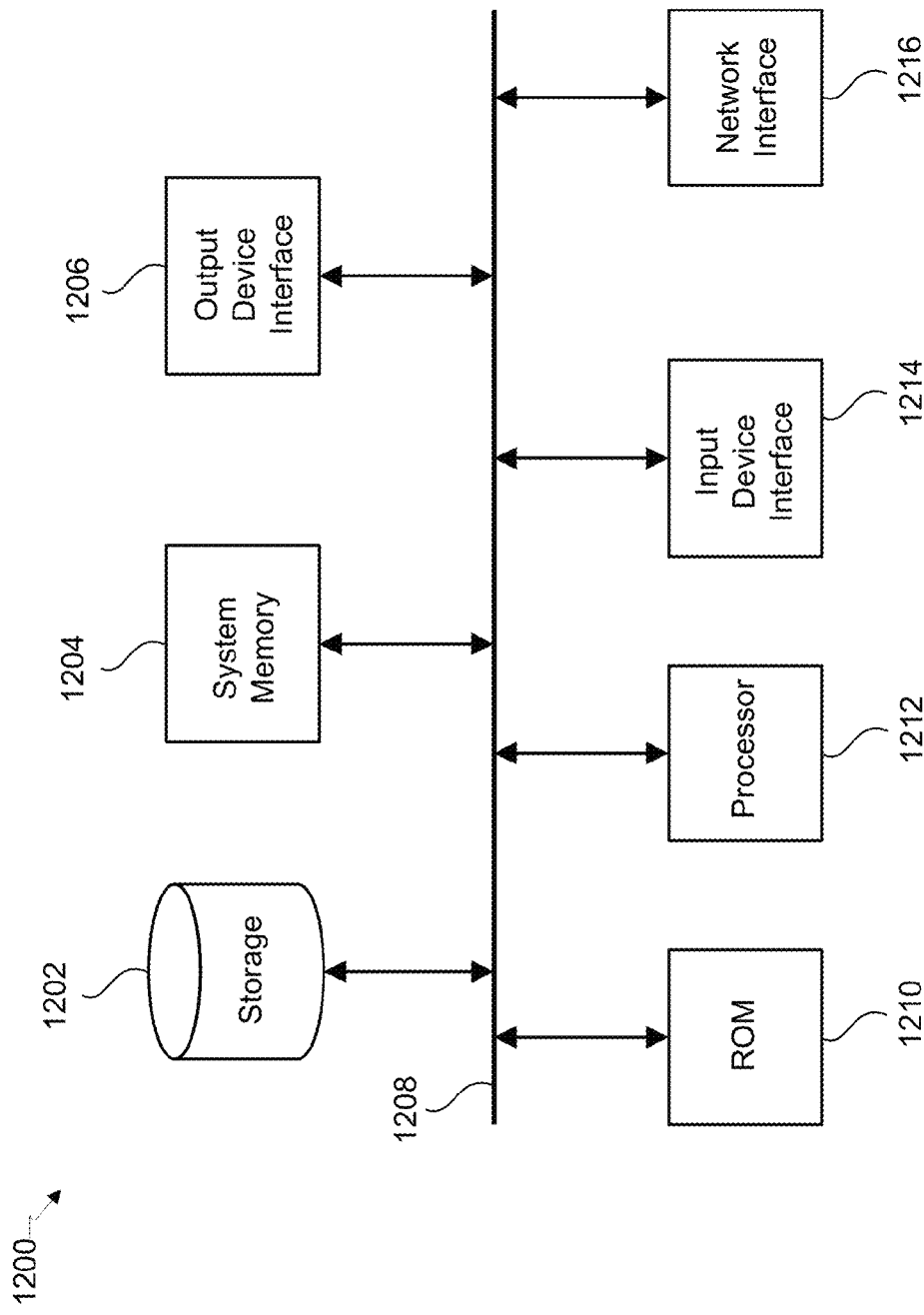
FIG. 12 conceptually illustrates an electronic system with which aspects of the subject technology can be implemented.

FIG. 12 conceptually illustrates an electronic system 1200 with which aspects of the subject technology can be implemented. The electronic system 1200, for example, can be a desktop computer, a laptop computer, a tablet computer, a server, a switch, a router, a base station, a receiver, a phone, a personal digital assistant (PDA), a gateway device, any device for receiving, transmitting, or routing a frame, or generally any electronic device that transmits signals/content over a network. Such an electronic system includes various types of computer readable media and interfaces for various other types of computer readable media. Electronic system 1200 includes bus 1208, processing unit(s) 1212, system memory 1204, read-only memory (ROM) 1210, permanent storage device 1202, input device interface 1214, output device interface 1206, and network interface 1216, or subsets and variations thereof.

Bus 1208 collectively represents all system, peripheral, and chipset buses that communicatively connect the numerous internal devices of electronic system 1200. In one or more implementations, bus 1208 communicatively connects processing unit(s) 1212 with ROM 1210, system memory 1204, and permanent storage device 1202. From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of the electronic system. Permanent storage device 1202, on the other hand, is a read-and-write memory device. This device is a non-volatile memory unit that stores instructions and data even when electronic system 1200 is off. One or more implementations of the subject disclosure use a mass-storage device (such as a magnetic or optical disk and its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such as random access memory. System memory 1204 stores any of the instructions and data that processing unit(s) 1212 needs at runtime. In one or more implementations, the processes of the subject disclosure are stored in system memory 1204, permanent storage device 1202, and/or ROM 1210. From these various memory units, processing unit(s) 1212 retrieves instructions to execute and data to process in order to execute the processes of one or more implementations.

Bus 1208 also connects to input and output device interfaces 1214 and 1206. Input device interface 1214 enables a user to communicate information and select commands to the electronic system. Input devices used with input device interface 1214 include, for example, alphanumeric keyboards and pointing devices (also called "cursor control devices"). Output device interface 1206 enables, for example, the display of images generated by electronic system 1200. Output devices used with output device interface 1206 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations can include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, bus 1208 also couples electronic system 1200 to a network (not shown) through network interface 1216. In this manner, the computer can be a part of a network of computers (such as a local area network ("LAN"), a wide area network ("WAN"), or an Intranet, or a network of networks, such as the Internet. Any or all components of electronic system 1200 can be used in conjunction with the subject disclosure.

Many of the above-described features and applications can be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media can be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more implementations, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component can also mean the processor being programmed to analyze and control the operation or the processor being operable to analyze and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) can apply to all configurations, or one or more configurations. A disclosure relating to such phrase(s) can provide one or more examples. A phrase such as an aspect can refer to one or more aspects and vice versa, and this applies similarly to other phrases. To the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

What is claimed is:

1. A method comprising:
   receiving, at an ingress port of a network device, a customer frame;
   generating a first header and a second header based at least in part on a customer local area network identifier and a customer destination address of the customer frame, the first header being a higher layer header than the second header;
   repurposing at least one field in at least one of the first header or the second header to store a value that is indicative of a Provider Backbone Bridging (PBB) protocol;
   generating a PBB field based at least in part on the customer local area network identifier;
   concatenating the first header, the second header, the PBB field, and the customer frame to form a frame; and
   providing the frame to an egress port of the network device for transmission, wherein the egress port is determined based on at least one of the first header or the second header.

2. The method of claim 1, further comprising determining an internal service identifier based on an identifier associated with the ingress port of the network device and the customer local area network identifier of the customer frame, wherein at least one of the first header or the second header is based on at least the internal service identifier and the customer destination address.

3. The method of claim 2, wherein the generating of the first header and the second header comprises performing a table lookup using the internal service identifier and the customer destination address.

4. The method of claim 1, further comprising determining an internal service identifier based on an identifier associated with the ingress port of the network device and the customer local area network identifier of the customer frame, wherein the PBB field is based on the internal service identifier.

5. The method of claim 4, wherein the generating of the PBB field comprises performing a table lookup using the internal service identifier.

6. The method of claim 1, wherein the first header comprises an Internet Protocol (IP) header and the at least one field comprises an IP protocol field of the IP header.

7. The method of claim 1, wherein the first header comprises a transport layer header and the at least one field comprises a destination port field of the transport layer header.

8. The method of claim 7, wherein the transport layer header is selected from the group consisting of a User Datagram Protocol header and a Transmission Control Protocol header.

9. The method of claim 1, wherein the PBB field comprises a backbone service instance identifier (I-SID) that is determined based at least in part on the customer local area network identifier.

10. A method for de-encapsulating a frame, the method comprising:
receiving, at an ingress port of a network device, the frame, wherein the frame comprises a first header and a second header, the first header being a higher layer header than the second header;
determining whether at least one field in at least one of the first header or the second header comprises a value that is indicative of a Provider Backbone Bridging (PBB) protocol;
responsive to the determining:
obtaining a PBB field from the frame; and
obtaining a customer frame from the frame, wherein the customer frame comprises a customer destination address;
determining destination information based at least on the customer destination address and the PBB field; and
providing the customer frame to an egress port of the network device for transmission, wherein the egress port is determined based at least on the destination information.

11. The method of claim 10, wherein the determining of whether at least one field in at least one of the first header or the second header comprises the value that is indicative of the PBB protocol comprises parsing the frame to check for the value.

12. The method of claim 11, wherein the first header comprises an Internet Protocol (IP) header and the value is stored in an IP protocol field of the IP header.

13. The method of claim 11, wherein the first header comprises a transport layer header and the value is stored in a destination port field of the transport layer header.

14. The method of claim 10, the second header comprising an Ethernet header, the method further comprising determining whether to de-encapsulate the frame based at least on a destination media access control address of the Ethernet header and media access control address of the network device.

15. The method of claim 14, the first header comprising an Internet Protocol (IP) header, wherein the determining of whether to de-encapsulate the frame is further based on one or more of: an identifier associated with the ingress port of the network device, a virtual local area network identifier of the frame, a source address associated with the IP header, or a destination address associated with the IP header.

16. The method of claim 10, further comprising determining an internal service identifier based on the PBB field, wherein the destination information is based at least on the internal service identifier and the customer destination address.

17. The method of claim 16, wherein the determining of the destination information comprises performing a table lookup using the internal service identifier and the customer destination address to obtain the destination information.

18. A system, comprising:
memory comprising instructions; and
a processor configured to execute the instructions to:
receive, at an ingress port of the system, a first customer frame;
generate a first header and a second header based at least in part on a first customer local area network identifier and a first customer destination address of the first customer frame, the first header being a higher layer header than the second header;
repurpose at least one field in at least one of the first header or the second header to store value that is indicative of a Provider Backbone Bridging (PBB) protocol;
generate a first PBB field based at least in part on the first customer local area network identifier;
concatenate the first header, the second header, the first PBB field, and the first customer frame to form a first frame; and
provide the first frame to an egress port of the system for transmission, wherein the egress port is determined based on at least one of the first header or the second header.

19. The system of claim 18, wherein:
the processor is further configured to execute the instructions to:
receive, at a second ingress port of the system, a second frame, wherein the second frame comprises a third header and a fourth header, the third header being a higher layer header than the fourth header;
determine whether at least one field in at least one of the third header or the fourth header is repurposed to store a value that is indicative of the PBB protocol;
responsive to the determining:
obtain a second PBB field from the second frame; and
obtain a second customer frame from the second frame, wherein the second customer frame comprises a second customer destination address;
determining destination information based at least on the second customer destination address and the PBB field; and
provide the second customer frame to a second egress port of the system for transmission, wherein the egress port is determined based at least on the destination information.

20. The system of claim 19, the fourth header comprising an Ethernet header, wherein the processor is further configured to execute the instructions to determine whether to de-encapsulate the second frame based on a destination media access control address of the Ethernet header and media access control address of the system.

21. The system of claim 20, the third header comprising an Internet Protocol (IP) header, wherein the determining of whether to de-encapsulate the second frame is further based on one or more of: an identifier associated with the second ingress port of the system, a virtual local area network identifier of the second frame, a source address associated with the IP header, or a destination address associated with the IP header.

22. The system of claim 18, wherein the first header comprises an Internet Protocol (IP) header and the at least one field comprises an IP protocol field of the IP header.

23. The system of claim 18, wherein the first header comprises a transport layer header and the at least one field comprises a destination port field of the transport layer header.

* * * * *